US 9,141,594 B2

(12) United States Patent
Pittenger et al.

(10) Patent No.: US 9,141,594 B2
(45) Date of Patent: Sep. 22, 2015

(54) METHODS AND APPARATUS FOR REDACTING CONTENT IN A DOCUMENT

(75) Inventors: Jason T. Pittenger, San Francisco, CA (US); David Stromfeld, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1537 days.

(21) Appl. No.: 12/985,368

(22) Filed: Jan. 6, 2011

(65) Prior Publication Data
US 2014/0304594 A1 Oct. 9, 2014

Related U.S. Application Data

(63) Continuation of application No. 11/445,614, filed on Jun. 2, 2006, now Pat. No. 7,876,335.

(51) Int. Cl.
G06F 17/00 (2006.01)
G06F 17/24 (2006.01)

(52) U.S. Cl.
CPC ...................... *G06F 17/24* (2013.01)

(58) Field of Classification Search
CPC ....................................... G06F 17/24
USPC ......................... 715/243, 246, 247
See application file for complete search history.

(56) References Cited

U.S. PATENT DOCUMENTS

| 5,581,682 | A | 12/1996 | Anderson et al. |
| 6,903,751 | B2 | 6/2005 | Saund et al. |
| 7,088,375 | B1 | 8/2006 | Hamburg |
| 7,248,701 | B2 | 7/2007 | Gerrard et al. |
| 7,409,248 | B2 | 8/2008 | Davignon et al. |
| 7,428,701 | B1 | 9/2008 | Gavin et al. |
| 7,805,673 | B2 * | 9/2010 | der Quaeler et al. ......... 715/255 |
| 7,876,335 | B1 | 1/2011 | Pittenger et al. |
| 2002/0083079 | A1 * | 6/2002 | Meier et al. ................ 707/104.1 |
| 2003/0115481 | A1 | 6/2003 | Baird et al. |
| 2006/0232607 | A1 * | 10/2006 | Davignon et al. ............. 345/629 |
| 2006/0242558 | A1 | 10/2006 | Racovolis et al. |
| 2007/0030528 | A1 * | 2/2007 | Quaeler et al. ................ 358/453 |
| 2007/0183000 | A1 * | 8/2007 | Eisen et al. .................... 358/452 |
| 2009/0323087 | A1 * | 12/2009 | Luo ............................... 358/1.9 |

OTHER PUBLICATIONS

"Chapter 3: Creating Images in Layers, Mar. 22, 2001, Macmillan USA, www.ablongman.com/samplechapter/0789724251.pdf.", Mar. 22, 2001, p. 22.
"Layers in PageMaker 6.5; SeneFelder Services; 1997; http://members.shaw.ca/senefelder.services/PMLayers.html", p. 6.

(Continued)

*Primary Examiner* — Stephen Hong
*Assistant Examiner* — Marshon Robinson
(74) *Attorney, Agent, or Firm* — Kilpatrick Townsend & Stockton LLP

(57) ABSTRACT

A system redacts content in a multi-layered document by executing a content modifier process that redacts a first portion of content in a source layer and then automatically redacts related content in at least one target layer. The content modifier process overlays the source redaction region on corresponding areas of other layers in the document to identify target redaction regions in those other layers that contain target content. In turn, the content modifier process automatically identifies and redacts the target content within target redaction regions.

17 Claims, 11 Drawing Sheets

(56) References Cited

OTHER PUBLICATIONS

U.S. Appl. No. 11/445,614, Response to Amendment Under Rule 312 mailed Oct. 29, 2010.
U.S. Appl. No. 11/445,614, Amendment after Notice of Allowance filed Oct. 19, 2010.
U.S. Appl. No. 11/445,614, Notice of Allowance mailed Sep. 16, 2010.
U.S. Appl. No. 11/445,614, Response to Office Action filed Aug. 19, 2010.
U.S. Appl. No. 11/445,614, Advisory Action mailed Aug. 5, 2010.
U.S. Appl. No. 11/445,614, Response to Advisory Action filed Jul. 8, 2010.
U.S. Appl. No. 11/445,614, Final Office Action mailed Jun. 10, 2010.
U.S. Appl. No. 11/445,614, Interview Summary mailed Mar. 8, 2010.
U.S. Appl. No. 11/445,614, Response to Office Action filed Mar. 2, 2010.
U.S. Appl. No. 11/445,614, Office Action mailed Jan. 8, 2010.
U.S. Appl. No. 11/445,614, Response to Office Action filed Oct. 22, 2009.
U.S. Appl. No. 11/445,614, Office Action mailed Aug. 4, 2009.

\* cited by examiner

METHODS AND APPARATUS FOR REDACTING CONTENT IN A DOCUMENT

CROSS-REFERENCE TO RELATED APPLICATION

This application is a continuation of U.S. patent application Ser. No. 11/445,614 filed on Jun. 2, 2006, now allowed, the contents of which are incorporated herein by this reference.

BACKGROUND

Conventional computer systems operate software applications that assist users in document processing and modifying the information contained therein. Such software applications are commonly used to perform tasks for computer users such as word processing, graphic design, image processing and the like. Typically, these software applications provide users with a variety of tools that facilitate the modification of data within a document. More specifically, conventional software applications provide tools enabling a user to select data, such as text or image data, within a document and to manipulate and/or delete the selected data (e.g., highlighting a text string in a word processing document and subsequently deleting the highlighted text, or changing the font of the highlighted text).

As a more relevant example, various conventional software applications include redaction tools that modify, or mark-up, text data within a document such that the data is unrecognizable and/or irretrievable by other users who have subsequent access to the document. Generally, such conventional redaction tools modify text within a document resulting in a 'black box' or similar rectangular graphical barrier that serves as a place-filler in lieu of the redacted text. An example application of a conventional software redaction tool involves the redaction of sensitive information contained in electronic documents as part of the discovery phase during litigation.

SUMMARY

Conventional software applications that enable a user to redact data in a document suffer from a number of drawbacks. In particular, conventional software applications that contain multi-layered documents are limited in that these applications do not provide an integrated approach for automatically redacting multiple layers within the document. While some conventional technologies exist that do allow the piecemeal redaction of content in multiple layers, such technologies are not able to automatically redact content in separate layers in response to user-initiated redaction in a first layer. Thus, in light of conventional redaction software, a user must manually redact content contained in each layer of a multi-layered document in order to provide the desired result of uniformly redacted content among those multiple layers. This drawback is further exacerbated in documents containing numerous layers. For example, in a multi-layered schematic diagram of a circuit board having component layers and conductive layers, a user would have to redact a component (e.g., resistor, capacitor, etc.) at a component layer and then separately redact the corresponding etched trace element(s) at the conductive layers.

Another drawback results from the inability of conventional technology to partially redact corresponding content in separate layers of a document. In using the multi-layered circuit board schematic example, assume that a user redacts a graphical transistor element at the component level. Further assume that there is a corresponding etched trace element in the conductive layer with portions oriented both inside and outside of the redacted transistor region. With conventional technology, the user would have to manually redact portions of the corresponding etched trace element that fall within the redacted transistor region by applying a uniform redaction area in the conductive layer having the same size and relative proximity as the redaction region in the component layer.

Embodiments disclosed herein provide a method for redacting content in a multi-layered document by executing a content modifier process that redacts a first portion of content in a source layer and then automatically redacts related content in at least one target layer. The related content may correspond to the originally redacted first portion of content by its relative proximity to the first portion of content, or by some other logical relationship recognized by the content modifier. Embodiments of the content modifier process disclosed herein therefore substantially overcome the aforementioned drawbacks. The content modifier receives an identification of content to be redacted from a source layer in the document whereby the identification defines a source redaction region. Furthermore, the content modifier process overlays the source redaction region on corresponding areas of other layers in the document to identify target redaction regions in those other layers that contain target content. In turn, the content modifier process identifies and redacts the target content within target redaction regions.

For example, suppose a user is editing a multi-layered building schematic having a structural, an electrical and a plumbing layer. Further assume that the user selects an load-bearing wall object to redact in the structural layer. In accordance with embodiments discussed herein, upon the redaction of the load-bearing wall in the structural layer, the content modifier will automatically redact corresponding elements in the electrical and plumbing layers of the document. For instance, if an outlet object were housed in the load-bearing wall in the electrical layer, the content modifier would automatically redact the outlet object in the electrical layer. Moreover, if a portion of a pipe ran through the load-bearing wall in the plumbing layer, the content modifier would automatically redact that portion of the pipe which corresponds to the area where the load-bearing wall was redacted. In a separate embodiment discussed herein, the content modifier would automatically redact the entire pipe (e.g., the portions of the pipe located both inside and outside of the region defined by the redacted load-bearing wall) in the plumbing layer.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing and other objects, features and advantages of the invention will be apparent from the following more particular description of embodiments of the methods and apparatus for redacting content in a document, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for redacting content in a document.

DETAILED DESCRIPTION

Figure 1:
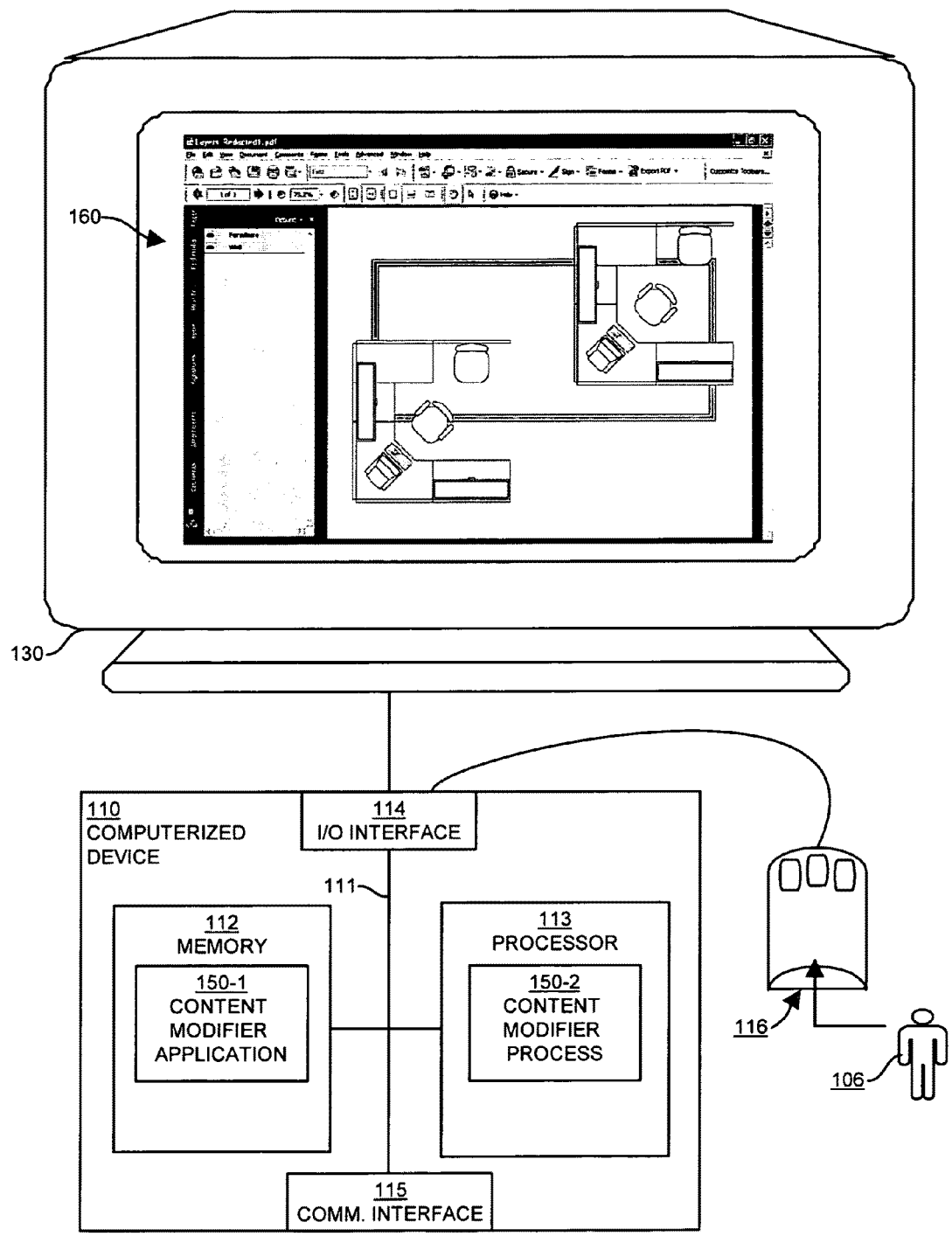
FIG. 1 is a block diagram of a computerized system configured with an application including a content modifier process in accordance with one embodiment of the invention.

FIG. 1 is a block diagram illustrating example architecture of a computer system 110 that executes, runs, interprets, operates or otherwise performs a content modifier application 150-1 and process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 106 to provide input signals and generally control a graphical user interface 160 that the content modifier application 150-1 and process 150-2 provides on the computer display 130.

The memory system 112 is any type of computer readable medium and in this example is encoded with a content modifier application 150-1 that supports generation, display, and implementation of functional operations as explained herein. The content modifier application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the content modifier application 150-1. Execution of the content modifier application 150-1 in this manner produces processing functionality in a content modifier process 150-2. In other words, the process 150-2 represents one or more portions or runtime instances of the application 150-1 (or the entire application 150) performing or executing within or upon the processor 113 in the computerized device 110 at runtime.

Further details of configurations explained herein will now be provided with respect to flow charts of processing steps that show the high level operations disclosed herein to perform the content modifier process 150-2, as well as graphical representations that illustrate implementations of the various configurations of the content modifier process 150-2.

Figure 2:
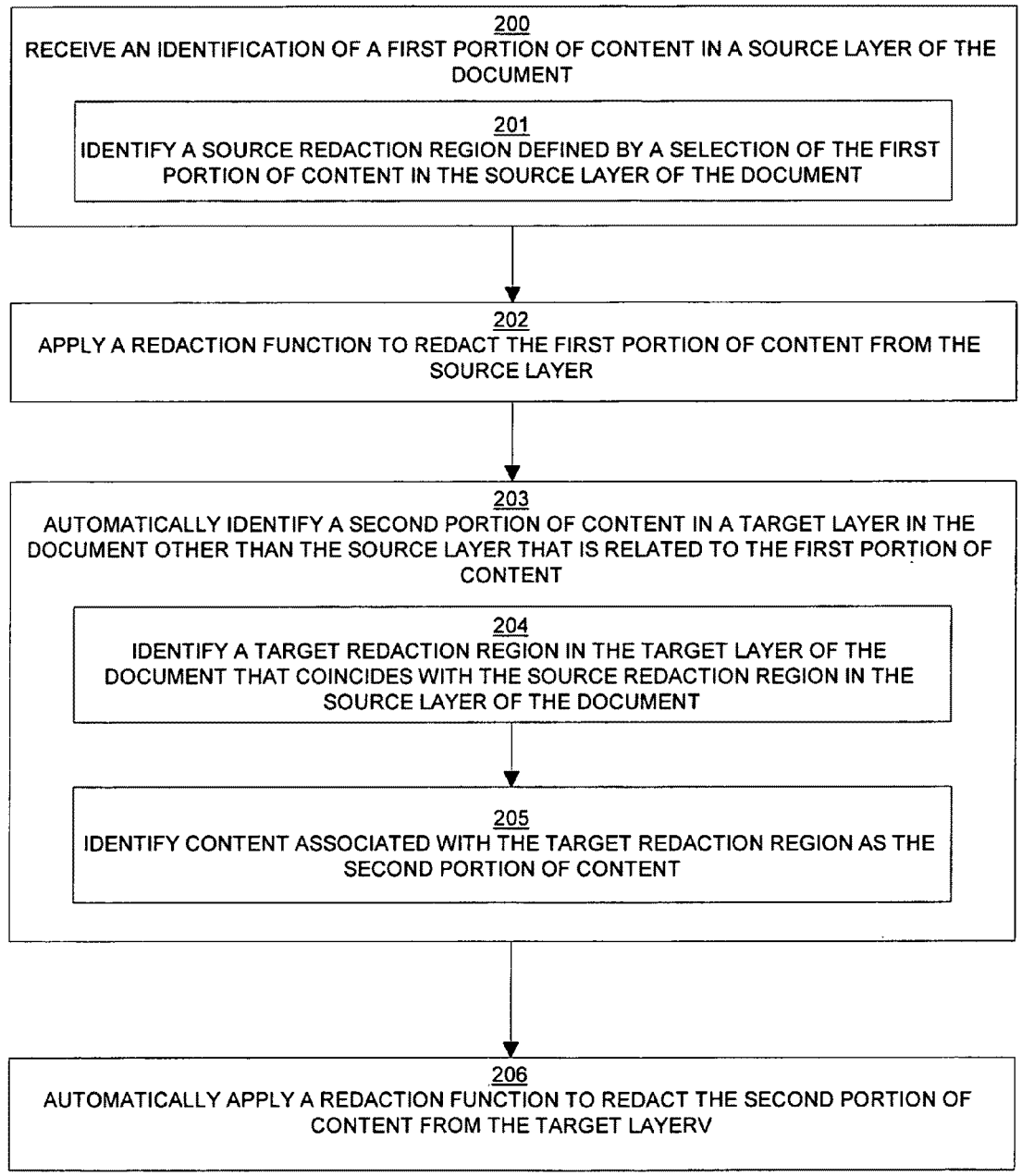
FIG. 2 is a flow chart of processing steps that shows high-level processing operations performed by the content modifier process when it processes document data in accordance with one example configuration of the invention.

FIG. 2 is a flow chart of processing steps that shows high-level processing operations performed by the content modifier 150 when it redacts data within a document in accordance with one example configuration.

In step 200, the content modifier 150 receives an identification for a first portion of content in a source layer of the document. Generally, a user selects, or highlights, a particular portion of content within the source layer of a document. The source layer is the active layer of the document (in most cases oriented in an unobstructed view in the graphical user interface) in which the user is currently working within. Typically, the user selects the first portion of content by manipulating a cursor in the graphical user interface 160 using a mouse, keyboard, or similar input device 116. For example, the user may highlight a particular portion of text by depressing a mouse button while dragging the cursor across the desired text or, alternatively, the user may use the arrow keys on a keyboard while depressing the Shift key.

Figure 3:
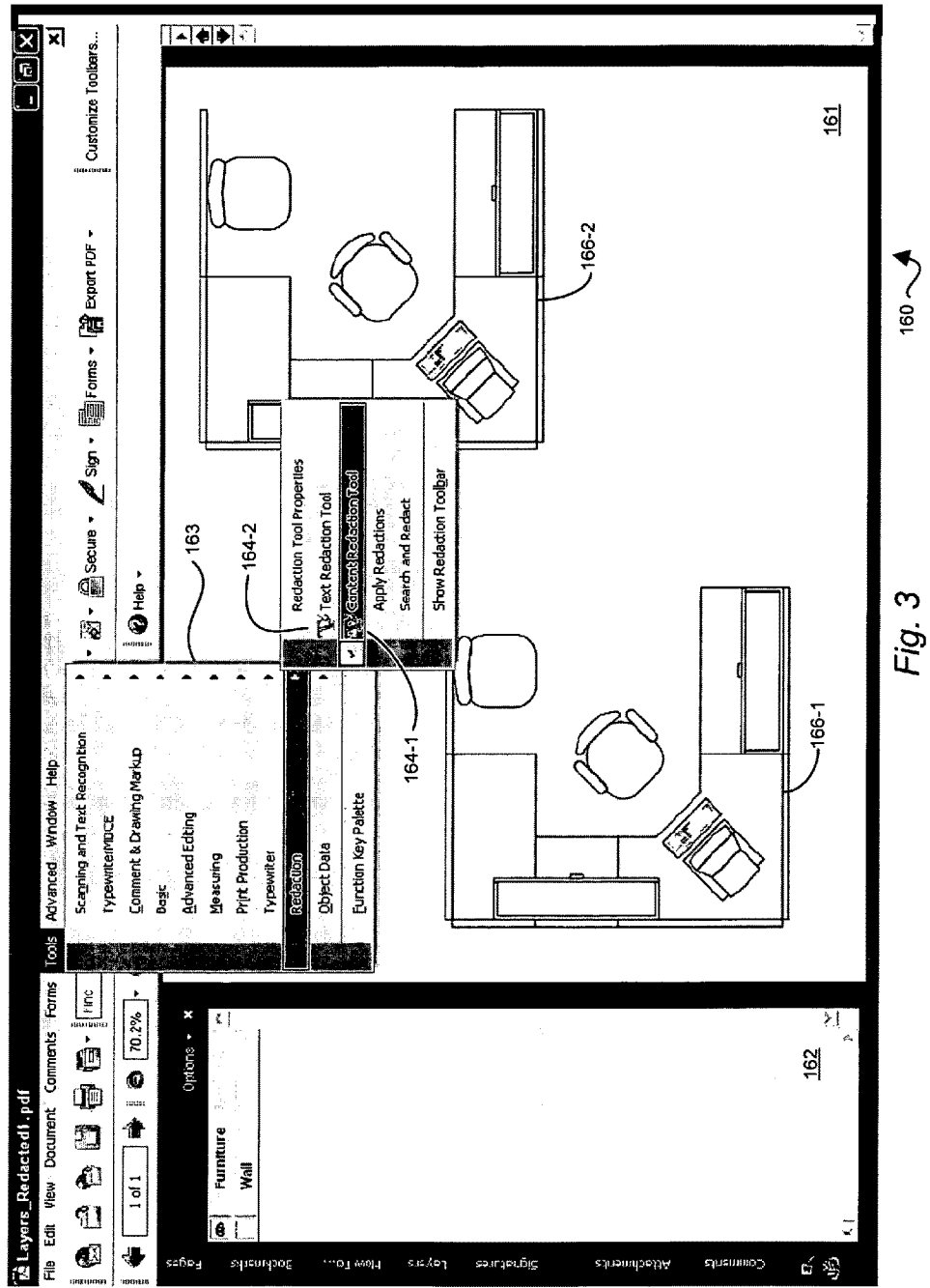
FIG. 3 is a graphical representation illustrating one example embodiment of a content modifier that includes a graphical user interface with a display area and object menu.

For instance, FIG. 3 is a graphical representation illustrating an example embodiment of the content modifier 150 that includes a graphical user interface 160 with a display area 161 and object menu 162. Contained within the display area 161 are graphical furniture objects 166-1 and 166-2. A drop down menu 163 is shown whereby the content redaction tool 164 has been selected by a user and is highlighted. With the content redaction tool 164, a user may select various graphical objects located in the display area 161 using any of the above methods. As an example, a user may employ content redaction tool 164-1 to select furniture object 166-1 with an input device (e.g., a mouse) by highlighting the desired object with the cursor. Similarly, in a separate embodiment a user may employ the text redaction tool 164-2 to highlight text in an Adobe® Portable Document Format (PDF) file being edited in an Adobe Acrobat® application.

Figure 4:
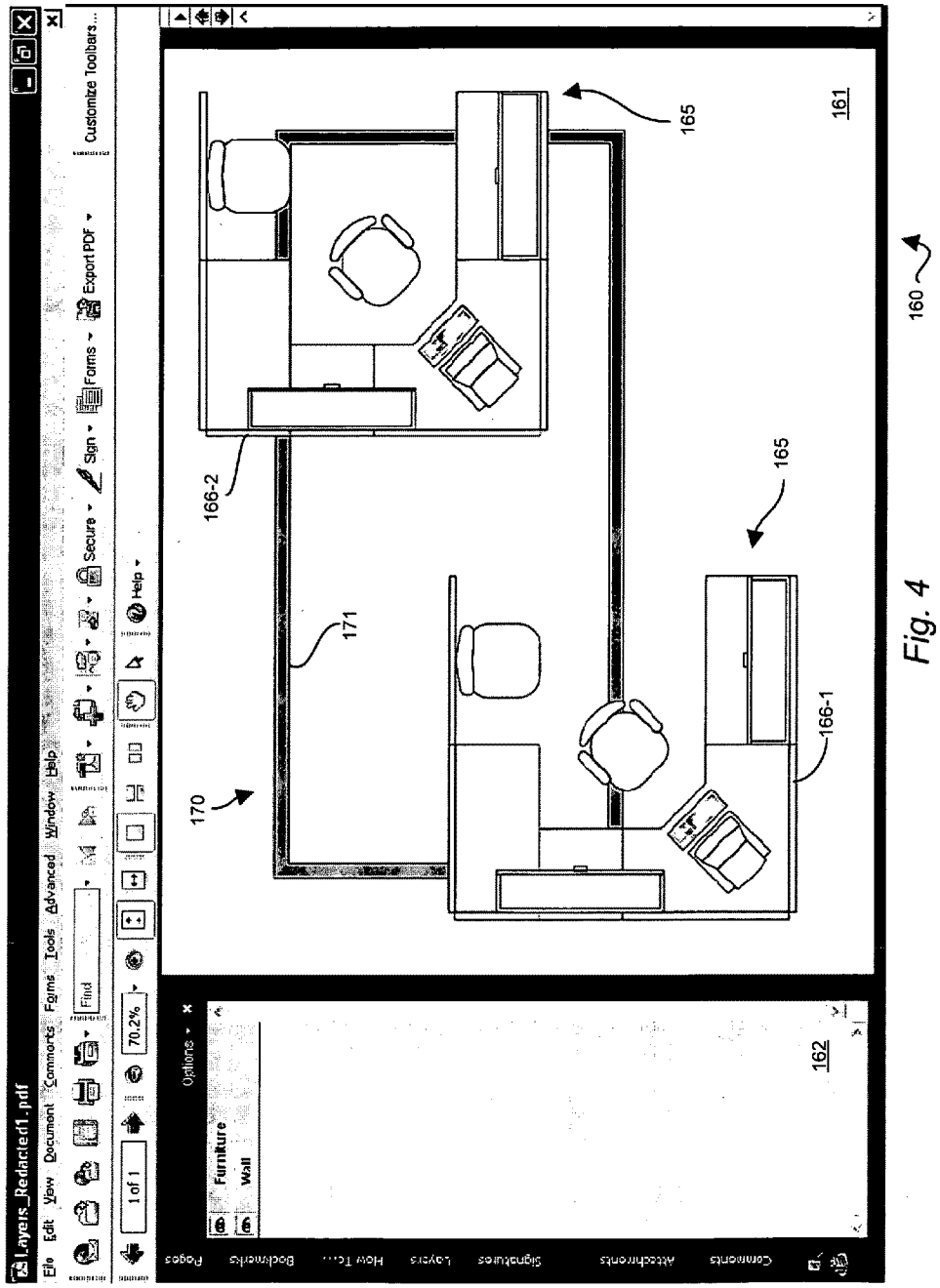
FIG. 4 is a graphical representation that illustrates one implementation of the content modifier process when it identifies two layers within a graphical user interface.

FIG. 4 is a graphical representation depicting an another example embodiment of the content modifier 150 that includes the graphical user interface 160 with display area 161 and object menu 162. The display area 160 contains a graphical representation of two separate layers within the graphical user interface 160 that are graphically situated in an overlapping configuration. The first layer 165 consists of a first furniture object 166-1 (e.g., a cubicle layout) and a second furniture object 166-2. The second layer 170 consists of a wall object 171 that is graphically situated below the first layer 165. To demonstrate this, the first layer 165 is said to be graphically oriented above the second layer 170 because the furniture objects 166 are displayed (instead of the wall object 171) where the two layers intersect. For purposes of this example, assume that a user has selected the first furniture object 166-1 in the first layer 165 via an input device 116 (e.g., a mouse). As such, the first layer 165 becomes the source layer and the content modifier 150 receives the identification of the first furniture object 166-1 as the first portion of content in the source layer.

In step 201, the content modifier 150 identifies a source redaction region 175 defined by a selection of the first portion of content in the source layer of the document. In other words, after receiving the identification of the first portion of content (e.g., the first furniture object 166-1), the content modifier 150 identifies a graphical region in the source layer in which to apply the redaction function. Typically, the source redaction region 175 is a substantially rectangular area proximately surrounding the first portion of content. However, the redaction region may assume any shape or size to adequately redact graphical elements in accordance with various embodiments of the content modifier 150 (e.g., a star-shaped redaction region for redacting a star-shaped object).

Figure 5:
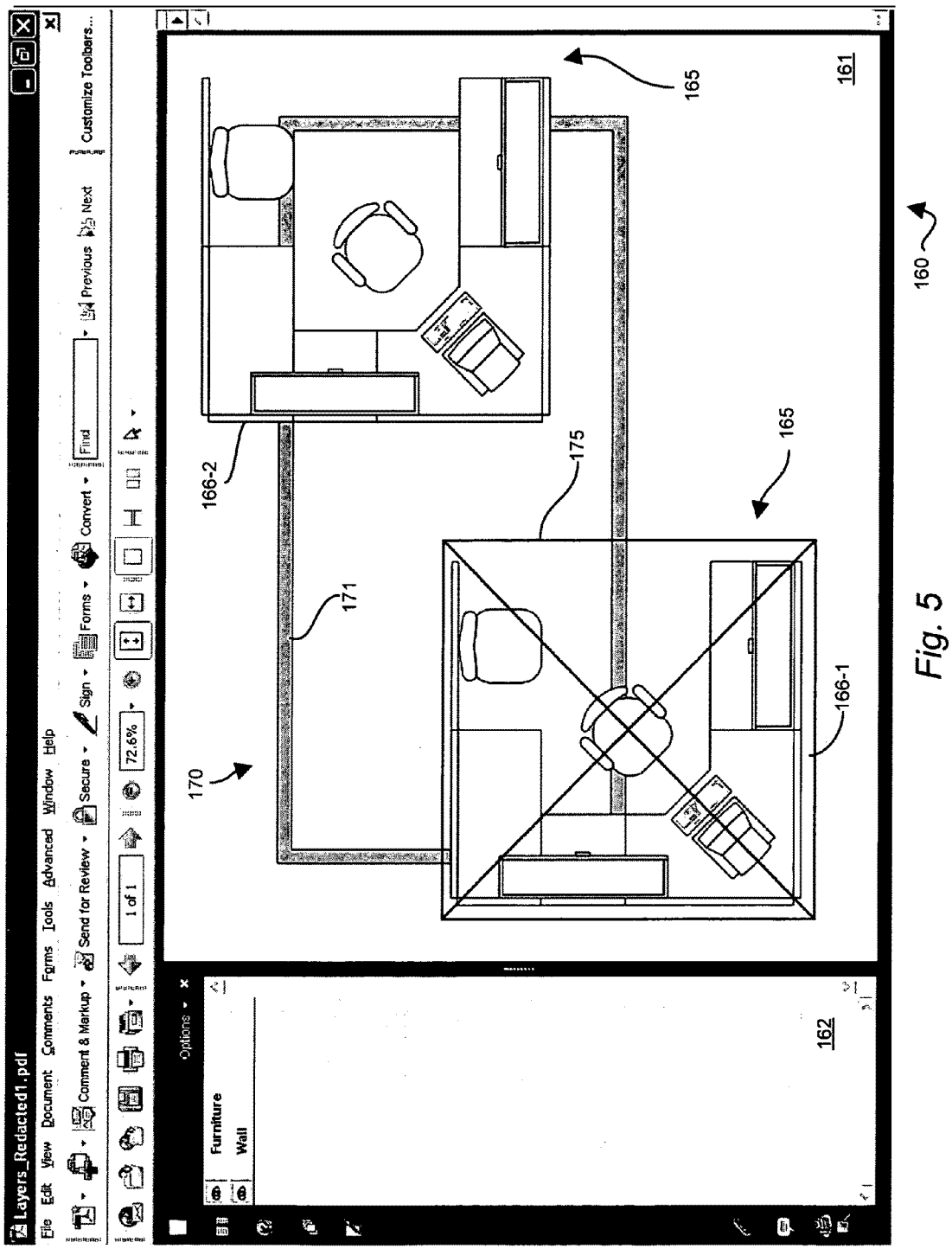
FIG. 5 is a graphical representation that illustrates one implementation of the content modifier process when it identifies a source redaction region within the source layer of a graphical user interface.

For example, FIG. 5 is a graphical representation illustrating an example configuration of the content modifier 150 that includes a graphical user interface 160 with a display area 161 and object menu 162. The display area 160 contains graphical representations of the first layer 165 graphically situated atop the second layer 170. In this example, a source redaction region 175 surrounds the first furniture object 166-1 and is indicated by an outlined box with an 'X' through the box.

In step 202, the content modifier 150 applies a redaction function to redact the first portion of content from the source layer. In various embodiments, the redaction function operates as a typical software redaction tool commonly known in the art. To that effect, a typical redaction function modifies the redaction region (e.g., converts all pixels within the redaction region to a uniform color) and removes the content from memory such that a subsequent user of the document would be unable to recover the redacted content.

In an example configuration depicted in FIG. 5, the content modifier 150 applies a redaction function to the first furniture object 166-1 in the first layer 165. As a result, the source redaction region 175 is modified such that the first furniture object 166-1 does not appear in the first layer 165. The entire wall object 171 still appears in the graphical user interface 160 since it is in a separate graphical layer (e.g., the second layer 170). In accordance with alternate configurations, the redaction function may modify the redaction region 175 by implementing various colors, patterns, user-defined text or other similar redaction schemes.

In step 203, the content modifier 150 automatically identifies a second portion of content in a target layer in the document other than the source layer that is related to the first portion of content. Typically, the second portion of content is related to the first portion of content by its relative proximity to the first portion of content in the target layer. For example, in FIG. 6 the content modifier 150 identifies the wall object 171 in the target layer (e.g., the second layer 170) as the second portion of content since, in relation to the source layer (e.g., the first layer 165), the wall object 171 is proximately located below the redacted first furniture object 166-1. However, in alternate embodiments the target layer content does not necessarily have to be proximately located relative to the first portion of content in the source layer in order to be identified as the second portion of content by the content modifier 150. Rather, the target layer content may have some other logical relationship with the first portion of content in the source layer (e.g., related content having a 'top secret' or 'confidential' classification).

In step 204, the content modifier 150 identifies a target redaction region 176 in the target layer of the document that coincides with the source redaction region in the source layer of the document. Accordingly, the target redaction region 176 defines an area substantially the same as the source redaction region 175 within the graphical user interface 160. As an example, in FIG. 6 the content modifier 150 identifies a target redaction region 176 that defines an area substantially the same as the source redaction region 175. In this example it appears that the source redaction region 175 was superimposed onto the target layer (e.g., the second layer 170) to create the target redaction region 176.

In step 205, the content modifier 150 identifies content associated with the target redaction region 176 as the second portion of content. In other words, after defining the target redaction region 176, the content modifier 150 identifies content from the target layer (e.g., the second layer 170) that is graphically situated within the target redaction region 176. As depicted in the example configuration of FIG. 5, the content modifier 150 identifies the portion of the wall object 171 oriented within the target redaction region 176 as the second portion of content. It should be noted that the content modifier 150 may identify other target layer objects oriented within the target redaction region as part of the second portion of content. For example, assume that a portion of a second wall object (defined in the target layer) is oriented within the target redaction region 176. As such, in an alternate embodiment the content modifier 150 may include the second wall object portion in addition to the first wall object portion as part of the second portion of content.

Figure 7:
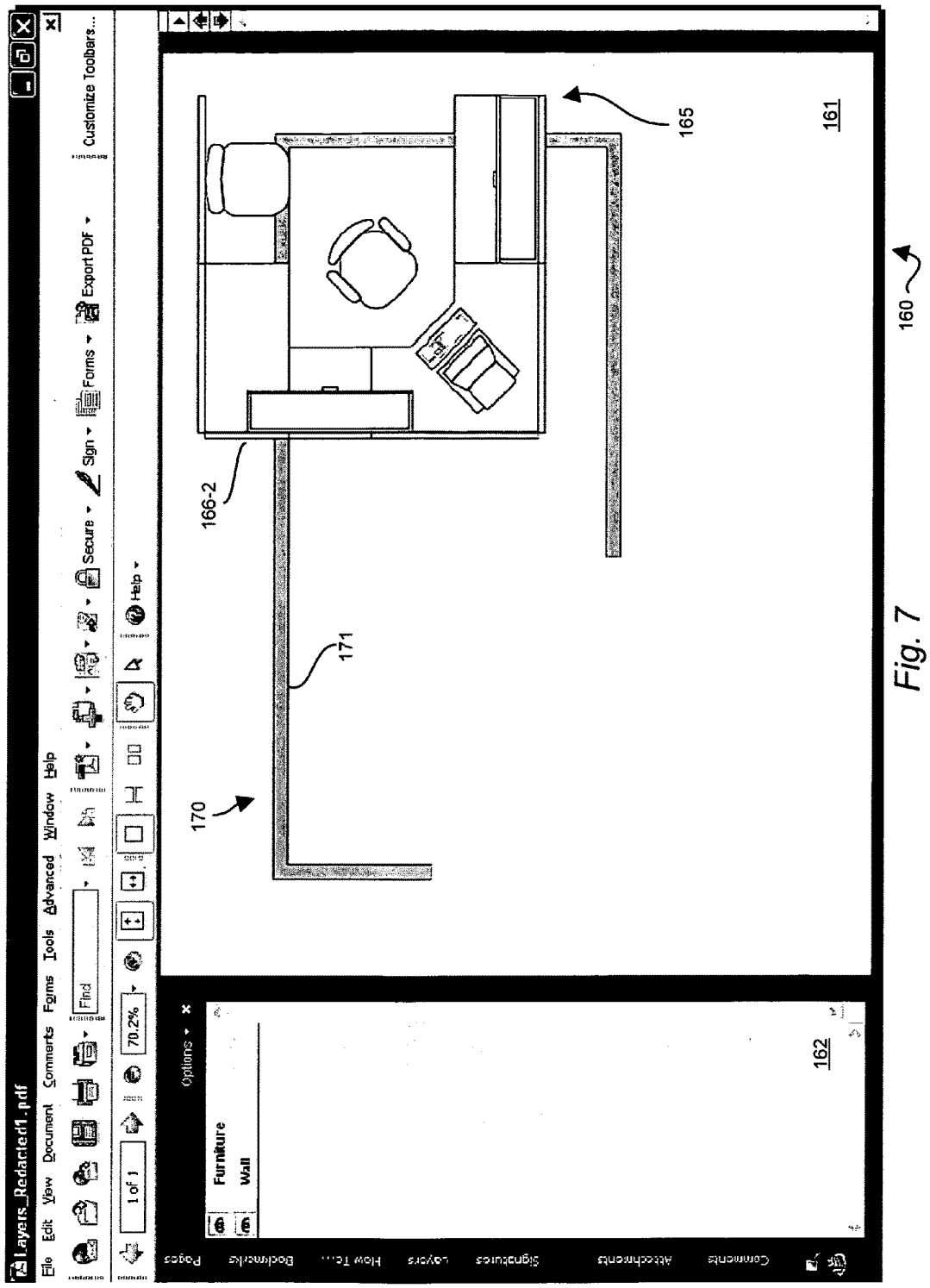
FIG. 7 is a graphical representation that illustrates one implementation of the content modifier process when it applies a redaction function to both the source and target redaction regions.

In step 206, the content modifier 150 automatically applies a redaction function to redact the second portion of content from the target layer. Similar to the redaction function applied to the source redaction region 175, the redaction function modifies the target redaction region 176 (e.g., converts all pixels within the redaction region to a uniform color) and removes the content from memory such that a subsequent user of the document would be unable to recover the redacted content. FIG. 7 illustrates an example configuration where the content modifier 150 automatically applies a redaction function to the target redaction region 176. As shown in FIG. 7, the second portion of content (e.g., the portion of the wall object 171 oriented within the target redaction region 176) has been redacted and removed from the graphical user interface 160.

Generally, in cases involving a plurality of layers in the document, the content modifier 150 repeats the steps of, i) automatically identifying a second portion of content (e.g., wall object 171) in the document that is related to the first portion of content (e.g., first furniture object 166-1), and ii) automatically applying a redaction function to redact the second portion of content. In operation, the content modifier 150 repeats the aforementioned steps for second portions of content in each of multiple layers of the document other than the source layer, so that the second portions of content in each of the multiple layers are automatically redacted.

Figure 8:
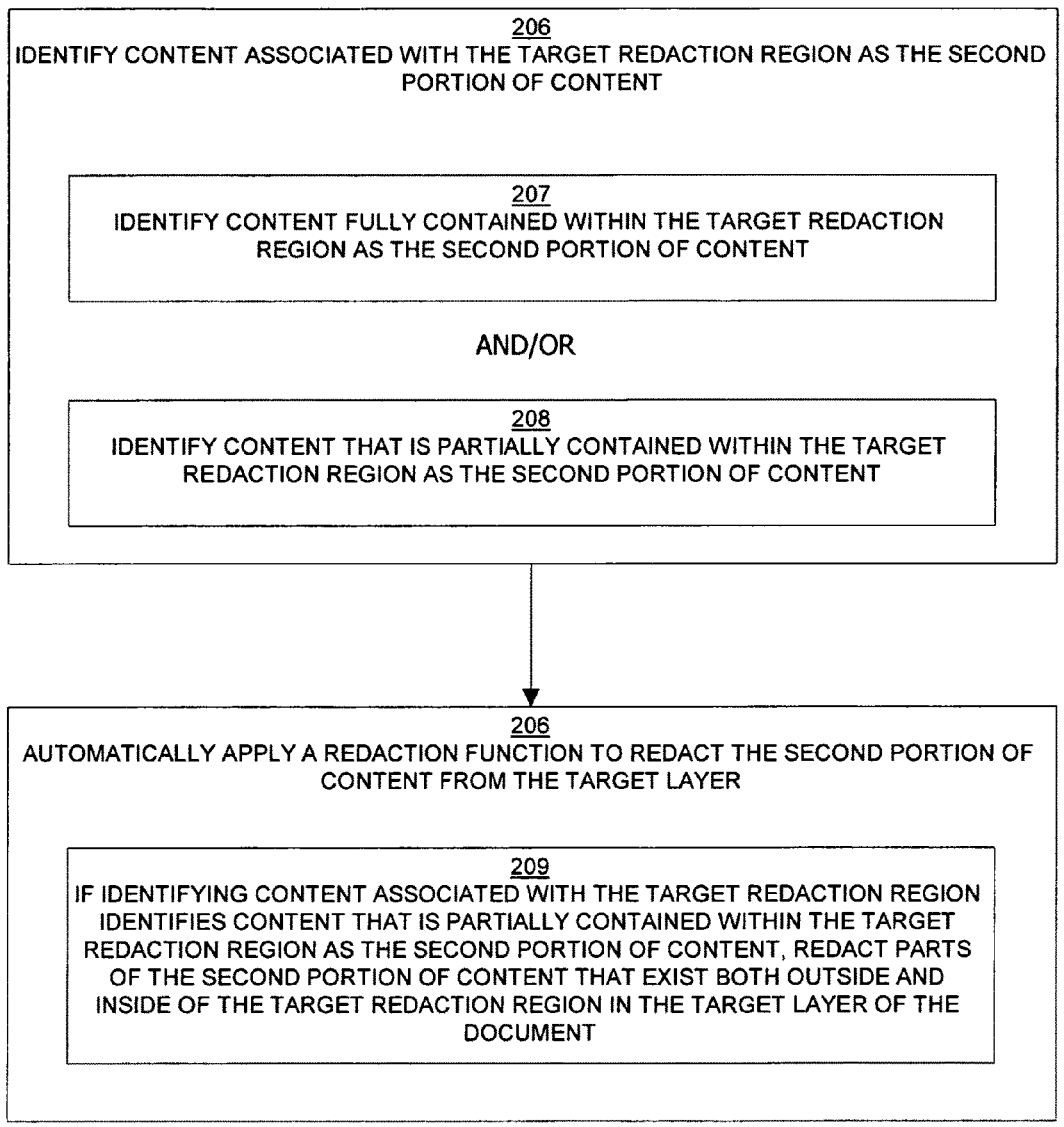
FIG. 8 is a flow chart of processing steps that shows high-level processing operations performed by the content modifier process when it identifies content associated with the target redaction region as the second portion of content in accordance with one example configuration of the invention.

FIG. 8 is a flow chart of processing steps that shows high-level processing operations performed by the content modifier 150 when it identifies content associated with the target redaction region as the second portion of content in accordance with one example configuration.

In step 207, the content modifier 150 identifies content fully contained within the target redaction region as the second portion of content. More specifically, only content from the target layer (e.g., the second layer 170) that is fully enclosed within the graphical bounds of the target redaction region 176 can be identified as the second portion of content. In referencing FIG. 6 as an example embodiment, the content modifier 150 would not identify the wall object 171 as a second portion of content because the wall object 171 is not fully contained within the target redaction region 176 boundaries.

Figure 6:
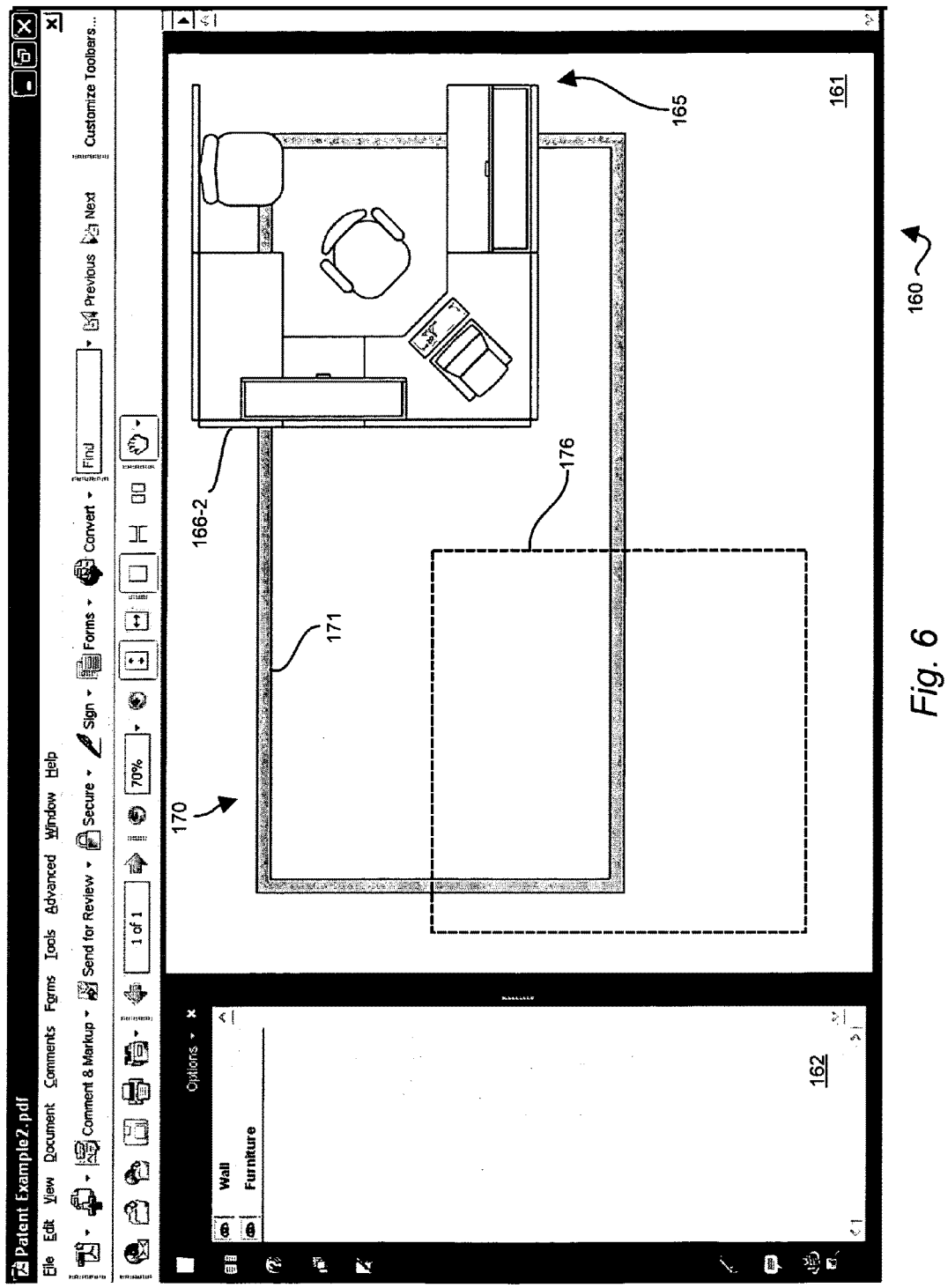
FIG. 6 is a graphical representation that illustrates one implementation of the content modifier process when it defines a target redaction region after a redaction function has been applied to the source redaction region.

In step 208, the content modifier 150 identifies content that is partially contained within the target redaction region as the second portion of content. Counter to step 207, the content modifier 150 identifies content that is graphically oriented both inside and outside of the target redaction region. Thus, as in one example embodiment, the entire wall object 171 shown in FIG. 6 is identified as the second portion of content by the content modifier 150 since the wall object 171 is at least partially contained within the target redaction region 176.

Figure 9:
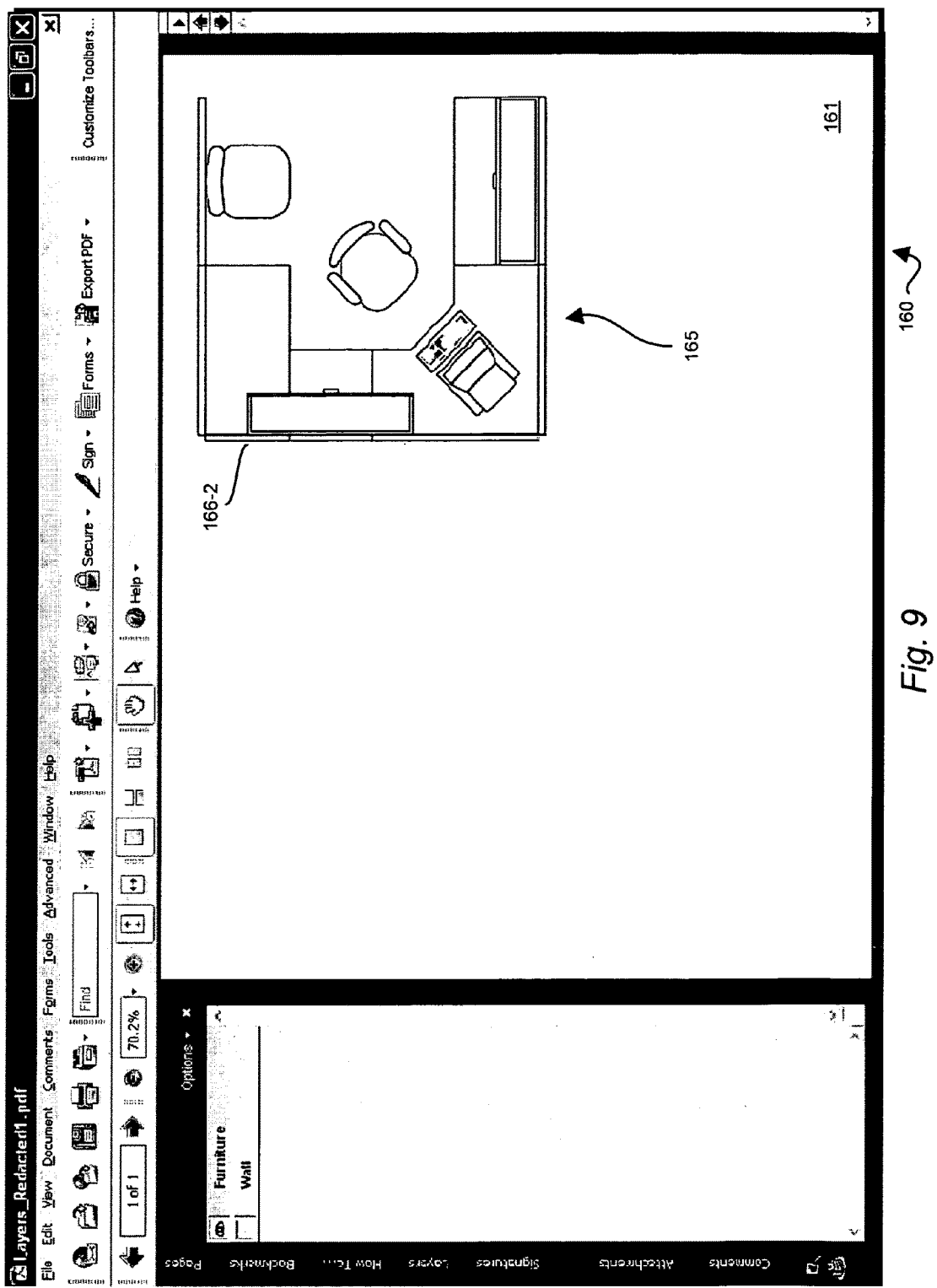
FIG. 9 is a graphical representation that illustrates one implementation of the content modifier process when it applies a redaction function to the entire second portion of content.

In step 209, if the content modifier 150 identifies content associated with the target redaction region identifies content that is partially contained within the target redaction region as the second portion of content, the content modifier 150 redacts parts of the second portion of content that exist both outside and inside of the target redaction region in the target layer of the document. In effect, if an object in the target layer at least partially intersects with the target redaction region, the content modifier 150 redacts the entire object as a result. To demonstrate, FIG. 9 shows an example embodiment whereby the entire wall object 171 has been redacted. This is due to the fact that, in reference to FIG. 5, the wall object 171 was at least partially contained within the target redaction region 176.

Figure 10:
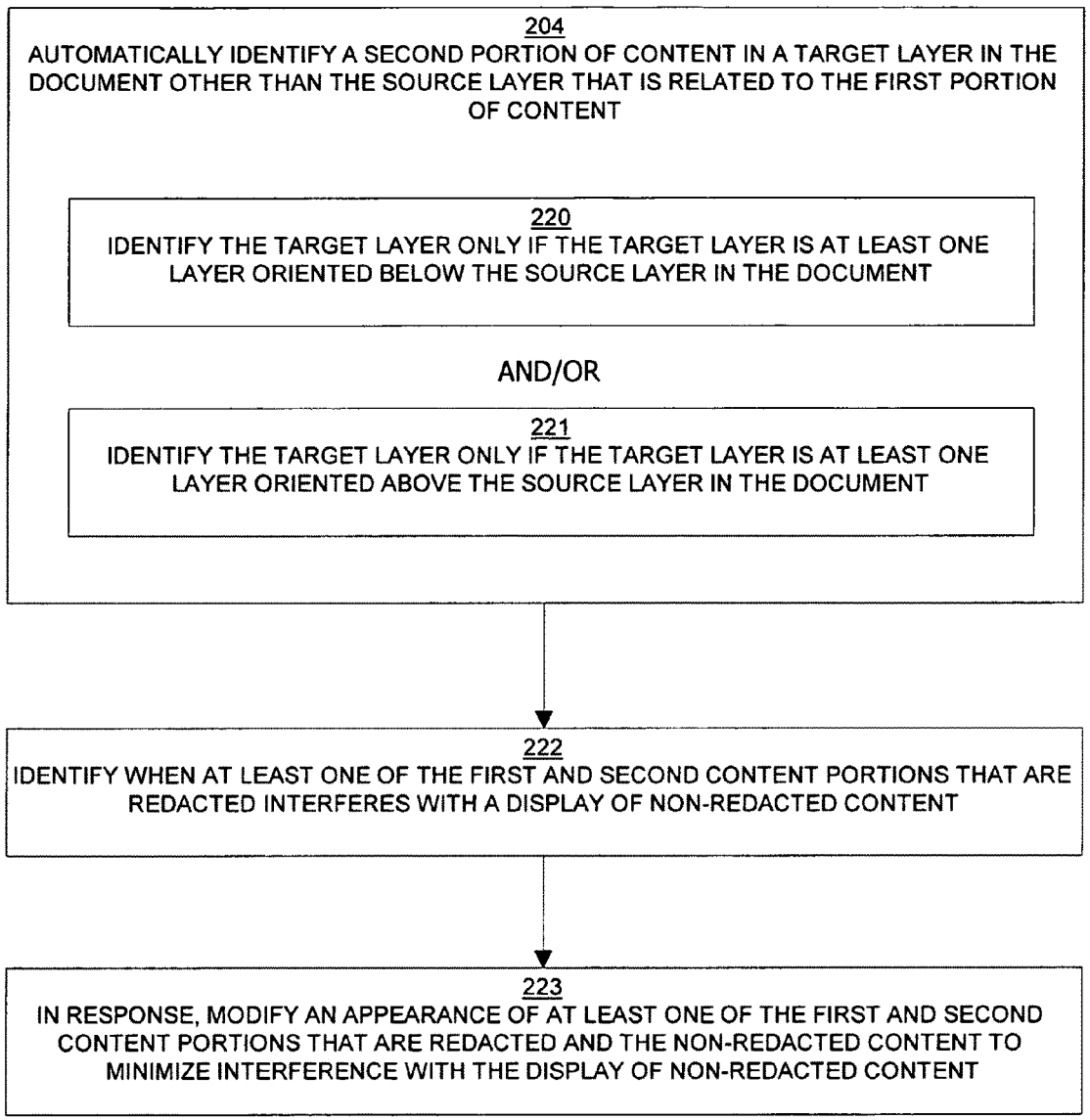
FIG. 10 is a flow chart of processing steps that shows high-level processing operations performed by the content modifier process when it identifies a second portion of content in a target layer in accordance with one example configuration of the invention.

FIG. 10 is a flow chart of processing steps that shows high-level processing operations performed by the content modifier 150 when it identifies a second portion of content in a target layer in accordance with one example configuration.

In step 220, the content modifier 150 identifies the target layer only if the target layer is at least one layer oriented below the source layer in the document. In some instances where documents have multiple layers, the layout may be configured such that multiple layers are oriented both above and below the source layer. Typically, the orientation of the layers is graphically configured such that the layers located above overlap the layers located below. Nonetheless, layers within a document may be organized in other various logical representations that do not necessarily depend upon the graphical overlap within the display area 161 (e.g., related content having a 'top secret' or 'confidential' classification). With respect to step 220, only layers oriented below the source layer may be identified as target layers. As illustrated in an example embodiment shown in FIG. 4, the second layer 170 containing the wall object 171 is oriented below the first layer 165 since the content in the first layer 165 (e.g., the furniture objects 166) overlap the content in the second layer 170 (e.g., the wall object 171) and dominates the view in the graphical user interface 160.

In step 221, the content modifier 150 identifies the target layer only if the target layer is at least one layer oriented above the source layer in the document. In other words, only layers oriented above the source layer may be identified as target layers in this particular embodiment.

In step 222, the content modifier 150 identifies when at least one of the first and second content portions that are redacted interferes with a display of non-redacted content. Generally, there are two situations in which a redacted portion interferes with the display of non-redacted content. The first situation occurs when the redacted content is located in at least one layer oriented below the non-redacted content. As an example, if a rectangular region has been redacted (e.g., a black box replacing the content) in a layer oriented below a layer containing non-redacted text, the text may appear unreadable in the graphical user interface 160 due to the lack of contrast between the text and the redacted background. Likewise, a second situation may occur where the redacted content is located in at least one layer oriented above the non-redacted content. In a similar example, if a rectangular region has been redacted using a black box and that layer is oriented above a layer containing text, the text may be partially or completely obstructed by the above-layered redacted region. In either scenario, the content modifier 150 would identify when the redacted content portions interfere, obscure or obstruct the display of non-redacted content within the document, according to a particular embodiment of the invention.

In step 223, in response to the interfering content, the content modifier 150 modifies an appearance of at least one of the first and second content portions that are redacted and the non-redacted content to minimize interference with the display of non-redacted content. In one example embodiment, the content modifier 150 converts the interfering redacted portions into semitransparent (or semi-opaque) renditions of the original redacted portions. Thus, in the case of the interfering redacted portions oriented above the non-redacted content, the transparent quality of the redacted portions mitigates its obstructive effect.

Furthermore, in another embodiment the content modifier 150 changes the color of the interfering redacted portions. This is applicable where non-redacted text in one layer is unreadable because of the lack of contrast with the redacted portions situated in a lower layer. For instance, in an example configuration the content modifier 150 changes the color of the interfering redacted portions from black to yellow such that the non-redacted black text located in an above layer is discernible from the background redacted portions. Similarly, in yet another embodiment the content modifier 150 changes the color of the non-redacted content (instead of changing the color of the interfering redacted portion) such that the non-redacted content is discernible from the redacted background portions.

In still yet another embodiment, the content modifier 150 removes the interfering redacted portions such that remaining space in the graphical user interface 160 appears blank and/or unoccupied. This configuration may be implemented when the interfering redacted portions are located either above or below the layer containing the non-redacted content.

Figure 11:
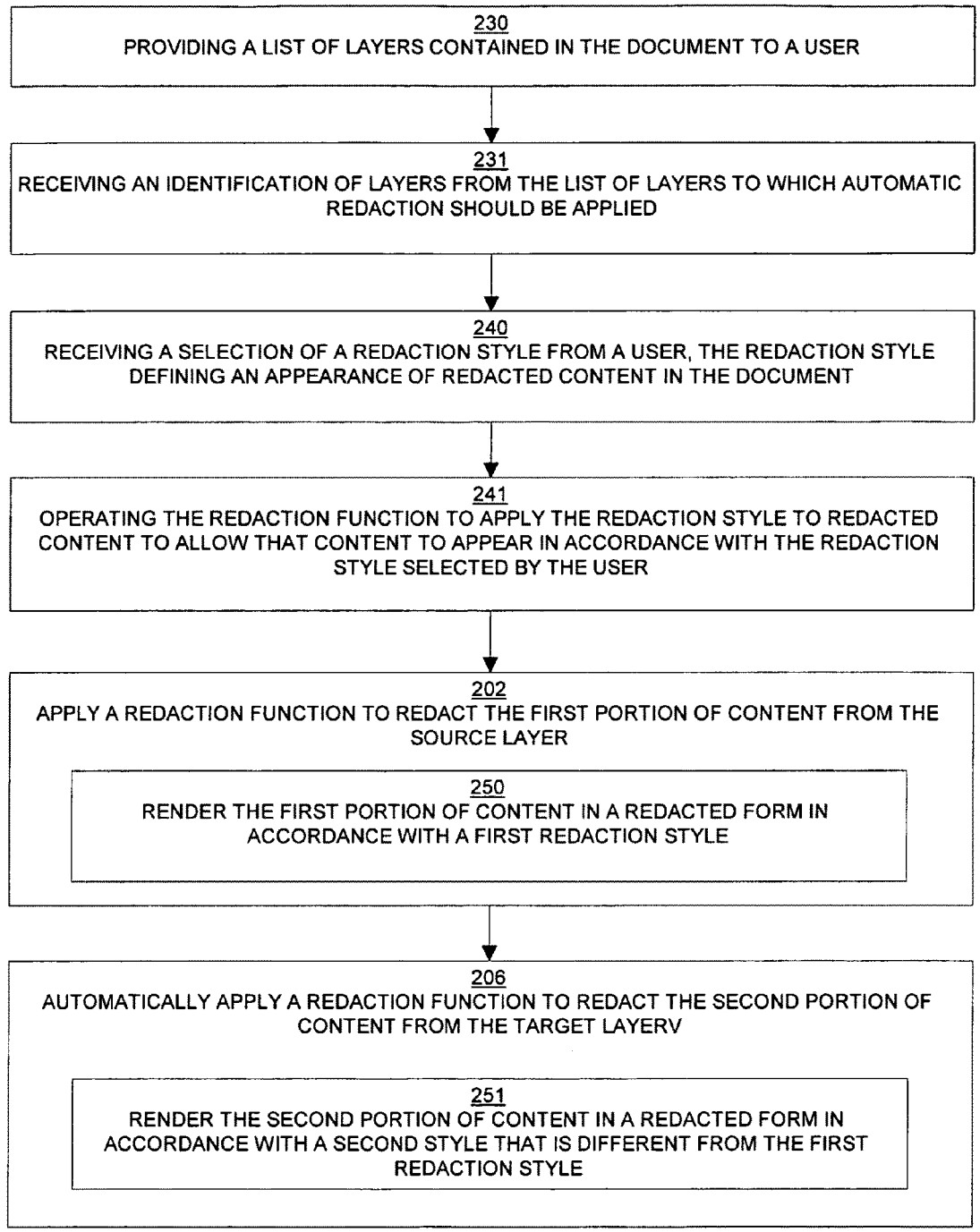
FIG. 11 is a flow chart of processing steps that shows high-level processing operations performed by the content modifier process when it redacts data within a document in accordance with one example configuration of the invention.

FIG. 11 is a flow chart of processing steps that shows high-level processing operations performed by the content modifier 150 when it redacts data within a document in accordance with one example configuration.

In step 230, the content modifier 150 provides a list of layers contained in the document to a user. Typically, the list of layers contains those layers that contain redactable content (e.g., data in which a redaction function can be applied thereto) within the document. In various embodiments, the list of layers may be provided within the graphical user interface 160 as a list or table, in a drop down menu as a list or table, in a separate graphical user interface or window as a list or table, or any other similar means for presenting interactive data to a user in a display.

In step 231, the content modifier 150 receives an identification of layers from the list of layers to which automatic redaction should be applied. As a result, the content modifier 150 will apply the redaction function to only those layers (e.g., target layers) identified as redactable layers in accordance with the embodiments discussed herein. In one example configuration, a user selects (e.g., toggles a button in a drop down menu) those layers in which the redaction function should be automatically applied upon redaction of content within a source layer. Conversely, in a separate configuration, a user selects those layers in which the content modifier 150 should not apply the redaction function during the redaction of a source layer.

In step 240, the content modifier 150 receives a selection of a redaction style from a user, the redaction style defining an appearance of redacted content in the document. The selection of a redaction style may include, but is not limited to, a redaction color, a redaction pattern, a redaction texture, user-defined text, or a combination thereof, and/or other similar modes for varying the graphical representation of redacted data. In example embodiments, the selection of a redaction style may be provided within the graphical user interface 160 as a list or table, in a drop down menu as a list or table, in a separate graphical user interface or window as a list or table, or any other similar means for presenting interactive data to a user in a display.

In step 241, the content modifier 150 operates the redaction function to apply the redaction style to redacted content to allow that content to appear in accordance with the redaction style selected by the user. For example, suppose a user selects a redaction style that includes, inter alia, a hash pattern within the redaction region. Accordingly, the content modifier 150 will apply a redaction function to content having a respective redaction style such that the resultant redacted content would contain a hash pattern.

In step 250, the content modifier 150 renders the first portion of content in a redacted form in accordance with a first redaction style. In various embodiments, the first redaction style (e.g., color, pattern, text, etc.) may be predetermined by the content modifier 150, a separate process and/or a user.

In step 251, the content modifier 150 renders the second portion of content in a redacted form in accordance with a second redaction style that is different from the first redaction style. According to one example embodiment, in order to discern between related redacted content in the layers of a document, the content modifier 150 renders the redacted content of the source layer in a different redaction style than the redacted content in the target layer(s). For example, in one embodiment the content modifier 150 renders a first portion of content in the source layer with a blue tint and, in turn, the content modifier 150 renders a second portion of content in a target layer with a red tint.

It is noted that example configurations disclosed herein include the content modifier application 150-1 itself (i.e., in the form of un-executed or nonperforming logic instructions and/or data). The content modifier application 150-1 may be stored on a computer readable medium (such as a floppy disk), hard disk, electronic, magnetic, optical or other computer readable medium. The content modifier application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the content modifier application 150-1 in the processor 113 as the content modifier process 150-2. In another alternative configuration, the content modifier process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

We claim:

1. A method comprising:
receiving, at a computerized device, a selection of a first portion of content in a source layer of a multi-layer document, wherein a source redaction region is defined by the selection of the first portion; and
applying, at the computerized device, a redaction function to redact the first portion of content from the source layer; and
in response to applying the redaction function, via the computerized device, automatically:
identifying a second portion of content for redaction in a target layer, the target layer graphically situated in an overlapping configuration with the source layer in the multi-layer document, wherein content associated with a target redaction region in the target layer is identified as the second portion of content, the target redaction region identified in the target layer based on the target redaction region in the target layer coinciding with the source redaction region defined by the selection in the source layer in which the first portion of content was redacted; and
applying the redaction function to redact the second portion of content from the target layer.

2. The method of claim 1 further comprising identifying content associated with the target redaction region as the second portion of content by identifying content fully contained within the target redaction region as the second portion of content.

3. The method of claim 1 further comprising identifying content associated with the target redaction region as the second portion of content by identifying content that is partially contained within the target redaction region as the second portion of content.

4. The method of claim 3 wherein applying the redaction function to redact the second portion of content further comprises redacting both:
   parts of the content partially contained within the target that are inside of the target redaction region; and
   parts of the content partially contained within the target that are outside of the target redaction region.

5. The method of claim 1 wherein the second portion is identified and redacted only if the target layer is below the source layer in the document.

6. The method of claim 1 wherein the second portion is identified and redacted only if the target layer is above the source layer in the document.

7. The method of claim 1 comprising:
   displaying, at the computerized device, a list of layers contained in the document; and
   receiving, at the computerized device, an identification of layers from the list of layers to which automatic redaction should be applied.

8. The method of claim 1 wherein the second portion of content is identified as content in the target layer having at least one similar privacy setting as the first portion of content.

9. A computerized device comprising:
   a memory, a processor and a communications interface coupled by an interconnection mechanism coupling, wherein the memory is encoded with a content modifier application that when executed on the processor provides a content modifier process that implements document processing on the computerized device, the content modifier process providing steps comprising:
      receiving a selection of a first portion of content in a source layer of a multi-layer document, wherein a source redaction region is defined by the selection of the first portion;
      applying a redaction function to redact the first portion of content from the source layer; and
      in response to applying the redaction function automatically:
         identifying a second portion of content for redaction in a target layer, the target layer graphically situated in an overlapping configuration with the source layer in the multi-layer document, wherein content associated with a target redaction region in the target layer is identified as the second portion of content, the target redaction region identified in the target layer based on the target redaction region in the target layer coinciding with the source redaction region defined by the selection in the source layer in which the first portion of content was redacted; and
         applying the redaction function to redact the second portion of content from the target layer.

10. The computerized device of claim 9 wherein the steps further comprise identifying content associated with the target redaction region as the second portion of content by identifying content fully contained within the target redaction region as the second portion of content.

11. The computerized device of claim 9 wherein the steps further comprise identifying content associated with the target redaction region as the second portion of content by identifying content that is partially contained within the target redaction region as the second portion of content.

12. The computerized device of claim 11 wherein applying the redaction function to redact the second portion of content further comprises redacting both:
   parts of the content partially contained within the target that are inside of the target redaction region; and
   parts of the content partially contained within the target that are outside of the target redaction region.

13. The computerized device of claim 9 wherein the second portion is identified and redacted only if the target layer is below the source layer in the document.

14. The computerized device of claim 9 wherein the second portion is identified and redacted only if the target layer is above the source layer in the document.

15. The computerized device of claim 9 wherein the steps further comprise:
   displaying a list of layers contained in the document; and
   receiving an identification of layers from the list of layers to which automatic redaction should be applied.

16. The computerized device of claim 9 wherein the second portion of content is identified as content in the target layer having at least one similar privacy setting as the first portion of content.

17. A non-transitory computer readable medium encoded with executable instructions operable on a processor, the instructions comprising:
   instructions for receiving, at a computerized device, a selection of a first portion of content in a source layer of a multi-layer document, wherein a source redaction region is defined by the selection of the first portion; and
   instructions for applying, at the computerized device, a redaction function to redact the first portion of content from the source layer; and
   instructions for, in response to applying the redaction function, via the computerized device, automatically:
      identifying a second portion of content for redaction in a target layer, the target layer graphically situated in an overlapping configuration with the source layer in the multi-layer document, wherein content associated with a target redaction region in the target layer is identified as the second portion of content, the target redaction region identified in the target layer based on the target redaction region in the target layer coinciding with the source redaction region defined by the selection in the source layer in which the first portion of content was redacted; and
      applying the redaction function to redact the second portion of content from the target layer.

* * * * *